(12) United States Patent
Kamijima

(10) Patent No.: US 7,841,746 B2
(45) Date of Patent: Nov. 30, 2010

(54) LIGHT SOURCE DEVICE, LIGHTING DEVICE, PROJECTOR, AND MONITORING DEVICE

(75) Inventor: Shunji Kamijima, Hara-mura (JP)

(73) Assignee: Seiko Epson Corporation, Tokyo (JP)

( * ) Notice: Subject to any disclaimer, the term of this patent is extended or adjusted under 35 U.S.C. 154(b) by 162 days.

(21) Appl. No.: 12/183,540

(22) Filed: Jul. 31, 2008

(65) Prior Publication Data
US 2009/0059601 A1    Mar. 5, 2009

(30) Foreign Application Priority Data
Aug. 28, 2007   (JP)   ............................. 2007-220831

(51) Int. Cl.
*F21V 17/02*   (2006.01)
(52) U.S. Cl. ....................... 362/282; 362/259; 362/455; 362/457; 342/101; 342/107
(58) Field of Classification Search ................. 362/282, 362/287, 259, 453, 455, 457; 372/101, 107
See application file for complete search history.

(56) References Cited

U.S. PATENT DOCUMENTS

| 5,418,700 | A | * | 5/1995 | Demeritt et al. ............. 362/259 |
| 6,299,331 | B1 | * | 10/2001 | Naoe et al. .................. 362/259 |
| 7,110,426 | B2 | | 9/2006 | Masuda |
| 2003/0099262 | A1 | | 5/2003 | Masuda |
| 2004/0240498 | A1 | | 12/2004 | Akamatsu et al. |
| 2006/0023173 | A1 | | 2/2006 | Mooradian et al. |
| 2006/0023757 | A1 | | 2/2006 | Mooradian et al. |
| 2006/0268241 | A1 | | 11/2006 | Watson et al. |
| 2006/0280219 | A1 | | 12/2006 | Shchegrov |
| 2007/0153862 | A1 | | 7/2007 | Shchegrov et al. |
| 2007/0153866 | A1 | | 7/2007 | Shchegrov et al. |

FOREIGN PATENT DOCUMENTS

| EP | 1 890 076 A1 | 2/2008 |
| JP | U-3-121602 | 12/1991 |
| JP | A-7-170009 | 7/1995 |
| JP | A-2003-46184 | 2/2003 |
| JP | A-2003-50413 | 2/2003 |
| JP | A-2005-277119 | 10/2005 |
| JP | A-2006-220857 | 8/2006 |
| JP | A-2006-332447 | 12/2006 |
| WO | WO 2006/129570 A1 | 12/2006 |

OTHER PUBLICATIONS

Mooradian et al.; High Power Extended Vertical Cavity Surface Emitting Diode Lasers and Arrays and Their Applications; Micro-Optics Conference, Tokyo, Nov. 2, 2005.

* cited by examiner

*Primary Examiner*—Stephen F Husar
(74) *Attorney, Agent, or Firm*—Oliff & Berridge, PLC

(57) ABSTRACT

A light source device includes: a light source which emits light; an optical member through which light emitted from the light source enters; a base on which the light source is mounted; a first holding member which fixes the optical member; and a second holding member which holds the first holding member and stands on the base in the emission direction of the light emitted from the light source.

8 Claims, 14 Drawing Sheets

LIGHT SOURCE DEVICE, LIGHTING DEVICE, PROJECTOR, AND MONITORING DEVICE

BACKGROUND

1. Technical Field

The present invention relates to a light source device, a lighting device, a projector, and a monitoring device.

2. Related Art

Recently, a coherent light source is an essential unit in the fields of image display apparatus, optical communication field, medical field, and measuring field such as microscope, and wavelengths of the coherent light to be used in these fields vary according to the purposes of use.

Thus, a wavelength converting element which utilizes non-linear optical effect and capable of expanding use wavelength range of a laser beam source by wavelength conversion for converting wavelength of light is currently used in a number of fields. According to the wavelength conversion of light utilizing non-linear optical effect, phase matching condition needs to be established between fundamental waves before conversion and higher harmonic waves after conversion. Thus, quasi phase matching method which periodically reversing polarization direction is used. More specifically, wavelength converting element (periodically poled lithium niobate (PPLN) which achieves quasi phase matching (QPM: quasi-phase-matching) by forming periodical polarization reversing structure on $LiNbO_3$ is used (for example, see JP-A-2006-332447).

A laser beam source device disclosed in JP-A-2006-332447 has a plate-shaped support base on which various components of a laser beam source unit are mounted. A PPLN folder is provided on the support base via a spacer for limiting the attachment height of the PPLN folder.

In case of optical components such as PPLN, performance is variable according to the entrance position of light. Thus, light needs to enter the optimum position.

According to the laser beam light source device shown in JP-A-2006-332447, the positions of the various optical components such as PPLN are not fixed to the support base, but are controlled relative to the light source. In this case, the conversion efficiency of the PPLN lowers, and the utilization efficiency of light entering the various optical components decreases.

Further, when alignment of the various optical components such as PPLN relative to the light source is carried out with the configuration, additional components for adjusting the positions of the optical components are required whereby the working efficiency lowers.

SUMMARY

It is an advantage of some aspects of the invention to provide a light source device capable of achieving position adjustment of a light source and an optical component with high efficiency and enhanced utilization efficiency of light.

A light source device according to a first aspect of the invention includes: a light source which emits light; an optical member through which light emitted from the light source enters; a base on which the light source is mounted; a first holding member which fixes the optical member; and a second holding member which holds the first holding member and stands on the base in the emission direction of the light emitted from the light source.

According to this structure, the optical member is held by the second holding member via the first holding member. Thus, the position of the second holding member can be adjusted to the base in a predetermined direction (including a predetermined angle) by controlling the position of the second holding member. Also, the position of the first holding member can be adjusted to the base in a direction different from the predetermined direction by controlling the position of the first holding member. As can be understood, the positioning direction (angle) can be divided into two parts by using the first holding member and the second holding member, and thus the degree of freedom for the shift range of the optical member relative to the base can be increased. Accordingly, light emitted from the light source can enter the optimum position of the optical member, and thus the utilization efficiency of light emitted from the optical member can improve.

Moreover, the first holding member stands on the base in the emission direction of the light emitted from the light source. In this case, the light emitted from the light source directly enters the optical member without bend of the optical path of the light from the light source by using a reflection member, for example. Thus, the positions of the light source and the optical member can be efficiently adjusted such that the light emitted from the light source can enter the optimum position of the optical member.

It is preferable that the first holding member is fixed to the second holding member by bonding or welding.

According to this structure, the first holding member is fixed to the second holding member by bonding or welding. Thus, the position of the optical member can be arbitrarily controlled in the emission direction of the light emitted from the light source by using the first holding member. Thus, the entire size of the device can be reduced by disposing the light source and the optical member close to each other.

When a converging unit is disposed between the light source and the optical member, the position of the optical member can be controlled such that the focal point of the converging unit lies on the entrance end surface of the optical member. Thus, the light utilization efficiency of the optical member can be increased.

Since the first holding member is fixed to the second holding member by bonding or welding, the incident angle of the light emitted from the light source with respect to the entrance end surface of the optical member can be arbitrarily controlled by using the first holding member. In this case, the light emitted from the light source can enter the entrance end surface of the optical member in the vertical direction. Thus, the light utilization efficiency of the optical member can be increased.

When the emission end surface of the light source is not parallel to the entrance end surface of the optical member due to inclination of the light source, the optical member can be adjusted such that these end surfaces can be parallel to each other.

It is preferable that the second holding member has a concave extending in the emission direction of the light emitted from the light source. In this case, it is preferable that at least a part of the first holding member is contained in the concave.

According to this structure, the position of the first holding member can be easily controlled in the emission direction of the light emitted from the light source by shifting the first holding member within the concave formed on the second holding member along the concave. In this case, the distance between the light source and the optical member held by the first holding member can be controlled such that the optical member is disposed at the optimum position with respect to the light source. Thus, the light utilization efficiency improves.

It is preferable that the second holding member is fixed to the base by bonding or welding.

According to this structure, the second holding member is fixed to the base by bonding or welding. Thus, the position of the optical member in the in-plane direction of the base on which the second holding member stands can be arbitrarily controlled. That is, the light entrance position of the entrance end surface of the optical member can be controlled. Accordingly, the light emitted from the light source can enter the optical position of the optical member.

Moreover, the second holding member is fixed to the base by bonding or welding. Thus, the rotation control of the optical member around the axis of the emission direction of the light emitted from the light source can be arbitrarily controlled by using the second holding member. This structure is particularly effective when a plurality of light sources are provided. When plural light sources are equipped, there is a possibility that not all plural lights emitted from the plural light sources enter the optical member. In this case, the lights emitted from the plural lights can enter the optimum position of the optical member by controlling the rotation of the optical member around the axis of the emission direction of the light emitted from the light source. Thus, the light utilization efficiency can improve.

It is preferable that at least either a light entrance end surface or a light exit end surface of the optical member projects toward the outside from the end surface of the first holding member in the center axis direction of the light emitted from the light source.

According to this embodiment, at least either the light entrance end surface or the light exit end surface of the optical member projects toward the outside from the end surface of the first holding member in the center axis direction of the light emitted from the light source. In this case, the optical member can be disposed close to another optical member (including light source) located before or behind the optical member. Thus, the optical member can be disposed at a more preferable position, and the entire size of the device can be reduced.

It is preferable that the optical member has an external resonator which resonates the light emitted from the light source.

When the optical member has the external resonator for resonating the light emitted from the light source, the reflection efficiency and reflection wavelength vary according to the light entrance position. In the light source device having the above structure, therefore, the light emitted from the light source can enter the optimum position of the external resonator by the above control. Thus, the light utilization efficiency of the external resonator can improve.

A lighting device in a second aspect of the invention includes the light source device described above.

The lighting device according to the aspect of the invention including the light source device achieving high light utilization efficiency can emit bright light.

A projector according to a third aspect of the invention includes: the light source device described above; a light modulating unit which modulates light emitted from the light source device; and a projecting device which projects light modulated by the light modulating unit.

The projector according to the aspect of the invention, light emitted from the light source device is modulated by the light modulating unit. Then, the modulated light is projected by the projecting device. The projector including the light source device achieving high light utilization efficiency can project a bright and clear image.

A monitoring device according to a fourth aspect of the invention includes: the light source device described above; and an image pickup unit which picks up an image of a subject by using light emitted from the light source device.

The monitoring device according to the aspect of the invention, light emitted from the light source device is applied to the subject, and an image of the subject is shot by the image pickup unit. Since the light source device capable of achieving high light utilization efficiency is used, bright light is applied to the subject. Thus, a clear image of the subject can be obtained by the image pickup unit.

BRIEF DESCRIPTION OF THE DRAWINGS

The invention will be described with reference to the accompanying drawings, wherein like numbers reference like elements.

DESCRIPTION OF EXEMPLARY EMBODIMENTS

A light source device, a lighting device, a projector, and a monitoring device as examples of the invention are hereinafter described with reference to the drawings. Scale reductions of the respective components in the figures are appropriately varied so that these components have sufficient sizes for recognition.

A light source device 10 according to a first embodiment of the invention is now described with reference to FIGS. 1 through 9.

Figure 1:
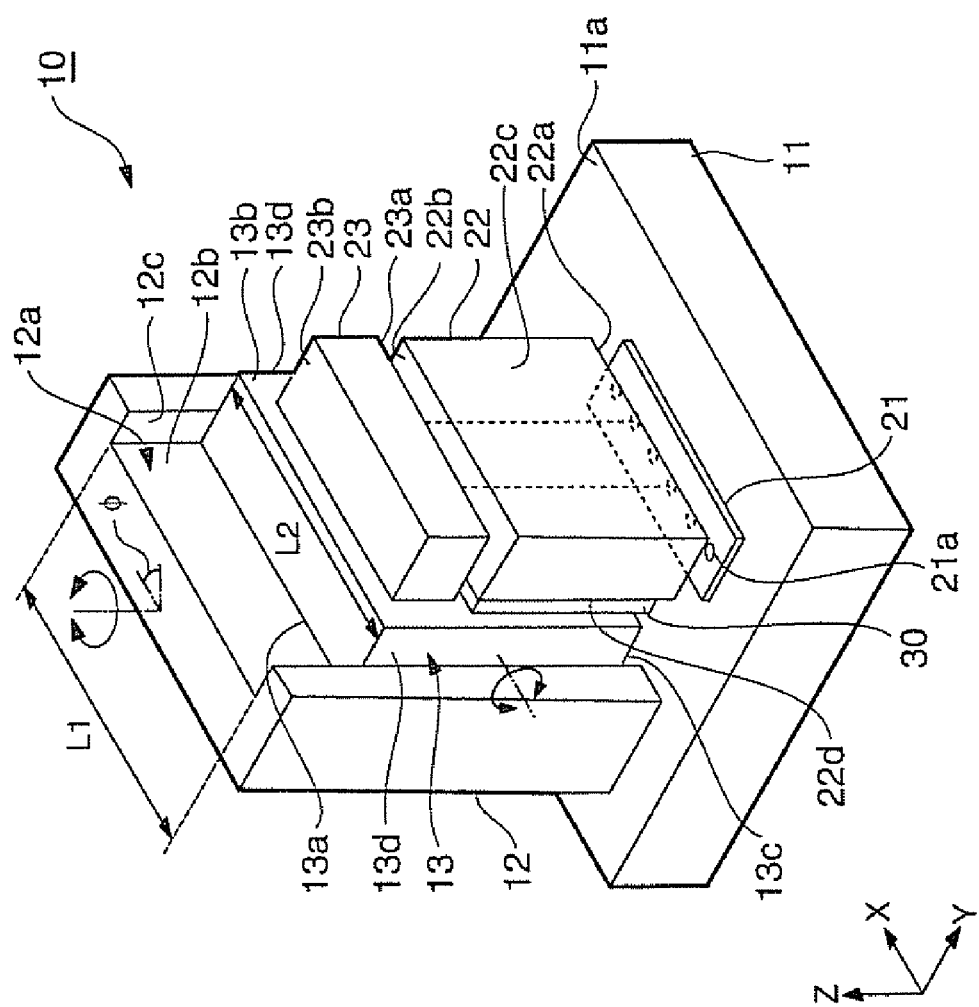
FIG. 1 is a perspective view showing the entire structure of a light source device according to a first embodiment of the invention.

As illustrated in FIG. 1, the light source device 10 in this embodiment includes a tower (second holding member) 12, a sub base (first holding member) 13, a light source 21, a wavelength converting element (optical member) 22, an external resonator (optical member) 23 on a base 11.

The light source 21 has a plurality of light emission elements 21a (six elements in the figure) arranged in one direction for emitting light. The arrangement direction of the light emission elements 21a corresponds to X direction, and emission direction of light emitted from the light emission elements 21a corresponds to Z direction. A direction perpendicular to the X and Z directions, that is, a direction perpendicular to the arrangement direction of the light emission elements 21a and parallel to an upper surface 11a of the base 11 corresponds to Y direction.

Respective lights emitted from the light emission elements 21a have approximately the same peak wavelength. However, peak wavelengths of these lights are not required to be the same, but may be more or less variable.

Figure 2:
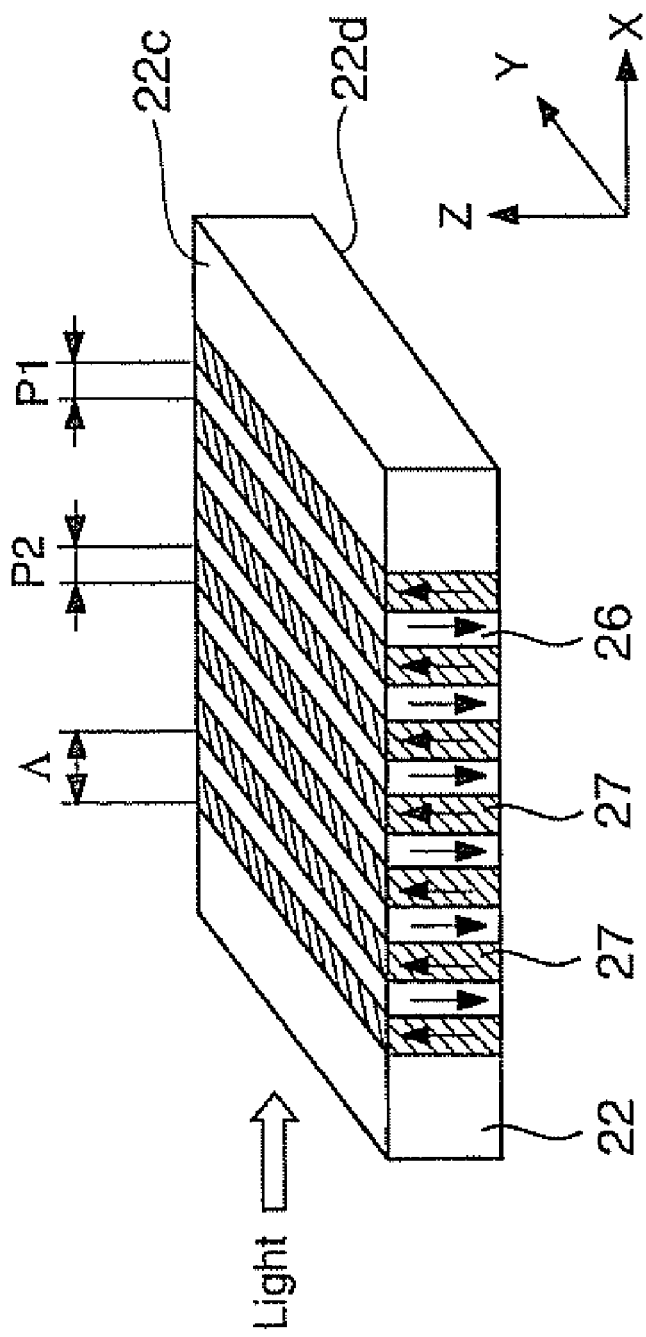
FIG. 2 is a perspective view showing a wavelength converting element included in the light source device shown in FIG. 1.

The wavelength converting element 22 (SHG: second harmonic generation) is an element for converting light emitted from the light source 21 into light having predetermined wavelength, as a non-linear optical element for converting entering light into light having approximately half wavelength. More specifically, the wavelength converting element 22 has a domain-repetitive structure alternately containing non-polarization inversion parts 26 and polarization inversion parts 27 as illustrated in FIG. 2. Each width of the non-polarization inversion parts 26 in the traveling direction of light emitted from the light source 21 in the interior of the wavelength converting element 22 is P1, and each width of the polarization inversion parts 27 in the same direction is P2. The width P1 and the width P2 are approximately the same. The pitch of the polarization inversion cycle is Λ.

For producing the polarization cyclic structure, a striped electrode pattern alternately containing electrode-areas and non-electrode areas is initially formed on one surface 22c of a substrate constituted by non-linear ferroelectric substance (such as $LiTaO_3$). Also, electrodes are formed throughout the other surface 22d. Then, pulsed voltage is applied between the electrode pattern on the one surface 22c and the electrode of the other surface 22d to produce polarization cyclic structure shown in FIG. 2. After the polarization cyclic structure is formed by this method, the electrode pattern is usually removed. However, this pattern may be left on the surface.

The light emission elements 21a are disposed opposed to a light entrance end surface 22a of the wavelength converting element 22 in the longitudinal direction of the entrance end surface 22a.

The external resonator 23 is constituted by a VBG (volume bragg grating) element. The external resonator 23 selects light having predetermined wavelength released from the wavelength converting element 22 and reflects the selected light toward the light source 21 to function as a resonator mirror of the light source 21. The external resonator 23 also transmits the converted light. The external resonator 23 is produced by applying two exposing beams to the base body, for example. In this case, the intervals of the interference fringes of the external resonator 23 are controlled such that light having predetermined selected wavelength can be reflected.

Figure 3:
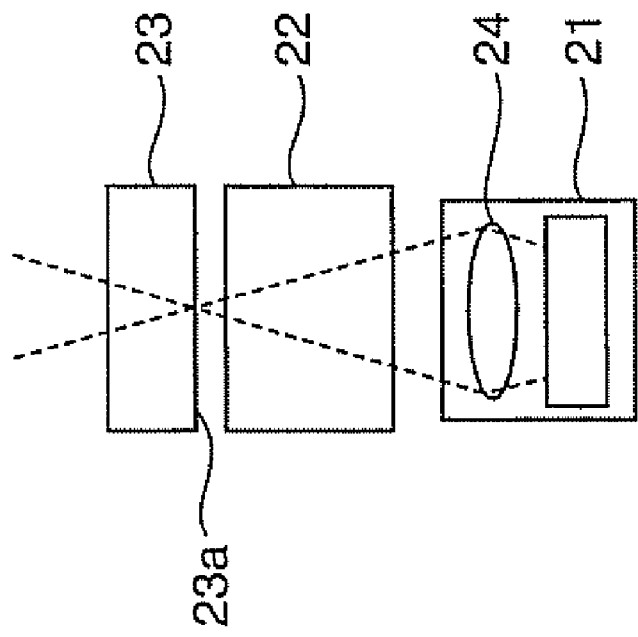
FIG. 3 is a plan view showing an optical path of the light source device shown in FIG. 1.

As illustrated in FIG. 3, a pseudo thermal lens 24 is produced inside the light source 21. The thermal lens 24 converges light emitted from the light emission elements 21a on an entrance end surface 23a of the external resonator 23.

As illustrated in FIG. 1, the tower 12 stands on an upper surface 11a of the base 11 in the emission direction of light emitted from the light emission elements 21a of the light source 21. The tower 12 is fixed to the upper surface 1a of the base 11. More specifically, the tower 12 is fixed after positioned within the upper surface 11a (XY plane) of the base 11.

The tower 12 is fixed after a rotation angle φ around the axis of the emission direction of the light emitted from the light emission elements 21a is controlled. More specifically, the tower 12 is fixed after entrance positions of plural lights emitted from the plural light emission elements 21a are controlled relative to the entrance end surface 22a of the wavelength converting element 22.

The tower 12 has a guide groove (concave) 12a opened in the Y direction. The width of the guide groove 12a in the X direction is L1.

The sub base 13 has a flat plate shape, and is disposed such that a bottom surface 12b of the guide groove 12a of the tower 12 is opposed to a surface 13a of the sub base 13. The wavelength converting element 22 and the external resonator 23 are fixed onto the other surface 13b of the sub base 13 in this order in the z direction from the light source 21 via a temperature control unit 30 to be described later. The exist end surface 22b of the wavelength converting element 22 and the entrance end surface 23a of the resonator 23 are disposed parallel to each other. The wavelength converting element 22 and the external resonator 23 are further disposed such that the exit end surface 22b of the wavelength converting element 22 and the entrance end surface 23a of the external resonator 23 can be close to each other as much as possible due to high energy density in the vicinity of the focal position of the thermal lens 24. The wavelength converting element 22 is disposed in such a position that the surface 22d having the electrodes is opposed to the other surface 13b of the sub base 13 at the time of manufacture.

Figure 4:
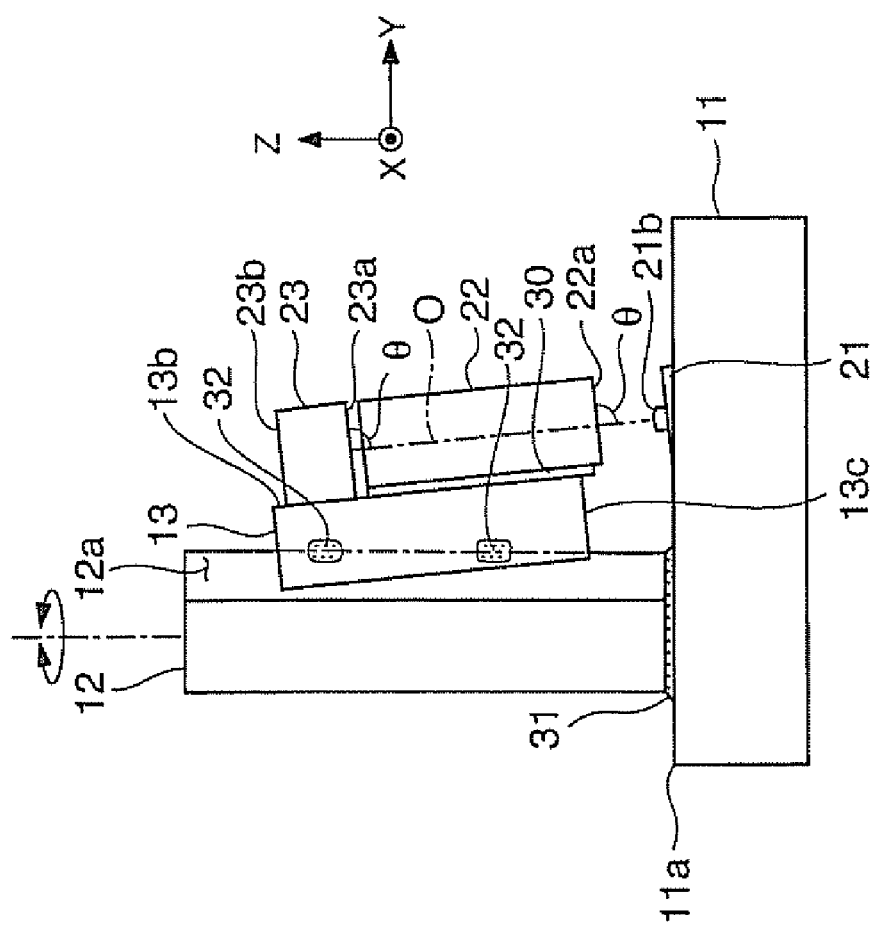
FIG. 4 is a cross-sectional side view showing a main part of the light source device shown in FIG. 1.

As illustrated in FIG. 4, the entrance end surface 22a of the wavelength converting element 22 projects from an end surface 13c of the sub base 13 on the light source 21 side in the center axis direction of light emitted from the light source 21 (Z direction) that is, toward the light source 21.

As illustrated in FIG. 1, a width L2 of the sub base 13 in the X direction is substantially the same as the width L1 of the guide groove 12a. Thus, the sub base 13 is held by the guide groove 12a of the tower 12 in such a manner as to slide along the guide groove 12a in the Z direction.

The sub base 13 is fixed with inclination to the axis of a direction parallel to the arrangement direction of the light emission elements 21a of the light source 21 (X direction). More specifically, as illustrated in FIG. 4r the sub base 13 is fixed to the tower 12 after an incident angle θ of a center axis O of light emitted from the light source 21 to the entrance end surface 22a of the wavelength converting element 22 and the incident angle θ of the center axis O of the light emitted from the light source 21 to the entrance end surface 23a of the external resonator 23 are controlled.

By controlling the incident angle θ, the positions of the entrance end surface 22a of the wavelength converting element 22 and the entrance end surface 23a of the external resonator 23 to the light emitted from the light source 21 in the Y direction are also controlled.

The temperature control unit 30 is provided between the wavelength converting element 22 and the sub base 13. The wavelength converting element 22 changes conversion wavelength by changing internal refractive index according to temperature variation. Thus, by controlling the temperature of the wavelength converting element 22 using the temperature control unit 30, the pitch Λ of the polarization inversion cycle of the wavelength converting element 22 can be controlled for improvement over light conversion efficiency.

The characteristics of the wavelength converting element 22 and the external resonator 23 are initially described.

Figure 5A:
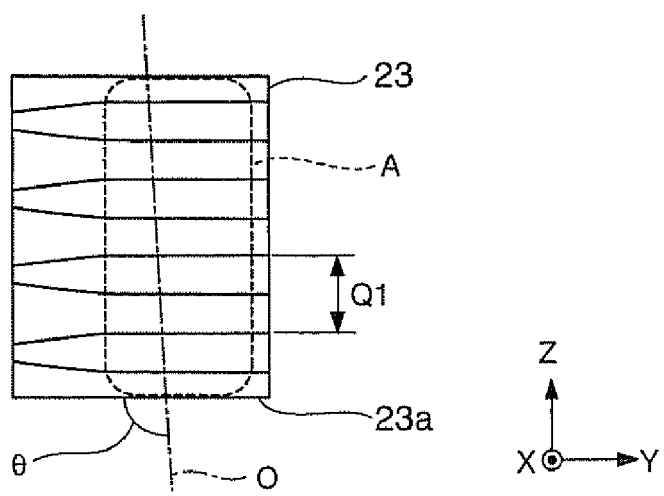
FIG. 5A illustrates the interior structure of an external resonator included in the light source device shown in FIG. 1.

As illustrated in FIG. 5A, a pitch Q1 of interference fringes of the external resonator 23 in the Z direction varies in the Y direction according to the inside interference exposure condition during manufacture. Thus, the reflection efficiency lowers depending on the position of the entrance end surface 23a through which light enters. In this embodiment, an area A surrounded by a broken line is a preferable area where the reflection efficiency is not low. More specifically, the area A is an area which efficiently reflects light not converted into light having predetermined wavelength after passing through the wavelength converting element 22 (light having the same wavelength after emission from the light source 21). Thus, light needs to enter this area A.

Figure 6A:
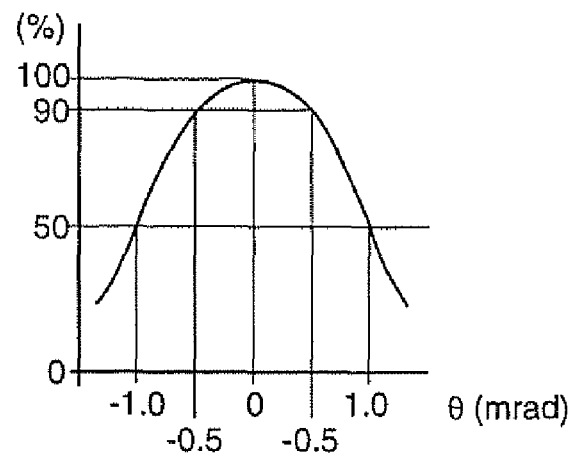
FIGS. 6A and 6B show characteristics of the external resonator included in the light source device shown in FIG. 1.
Figure 6B:
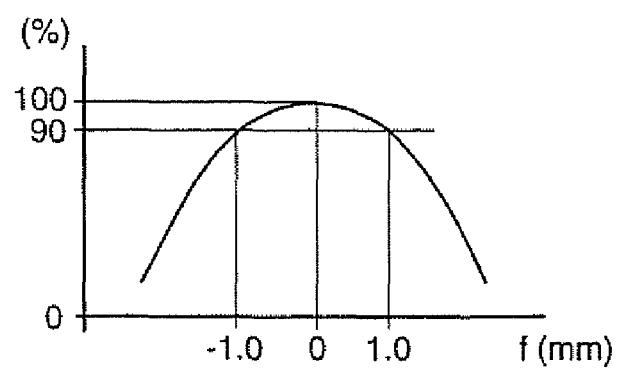

FIGS. 6A and 6B show the relationship between the angle formed by the entrance end surface 23a of the external resonator 23 and the center axis O of light (incident angle) θ and reflectance of light at the external resonator 23. More specifically, FIG. 6A shows changes in reflectance of light when the angle θ is shifted from 90 degrees as a reference angle of the angle θ. As can be seen from FIG. 6A, the reflectance of light lowers to about 90% of the reflectance of light having the angle θ of 90 degrees when the angle θ is shifted ±0.5 mrad from 90 degrees. It is thus of importance that light enters the external resonator 23 in the vertical direction, FIG. 6B shows the relationship between the position of the entrance end surface 23a of the external resonator 23 relative to the focal point of the thermal lens 24 and the reflectance of light at the external resonator 23. More specifically, FIG. 6B shows changes in reflectance of light when the entrance end surface 23a of the external resonator 23 is shifted in the Z direction from the focal point of the thermal lens 24 as a reference position of the entrance end surface 23a of the external resonator 23. As can be seen from FIG. 6B, the reflectance of light lowers to about 90% of the reflectance of light under the condition of the entrance end surface 23a positioned at the focal point of the thermal lens 24 when the entrance end surface 23a of the external resonator 23 is shifted ±1 mm from the focal point in the Z direction. It is thus of importance that the entrance end surface 23a of the external resonator 23 is disposed at the focal point of the thermal lens 24.

Figure 5B:
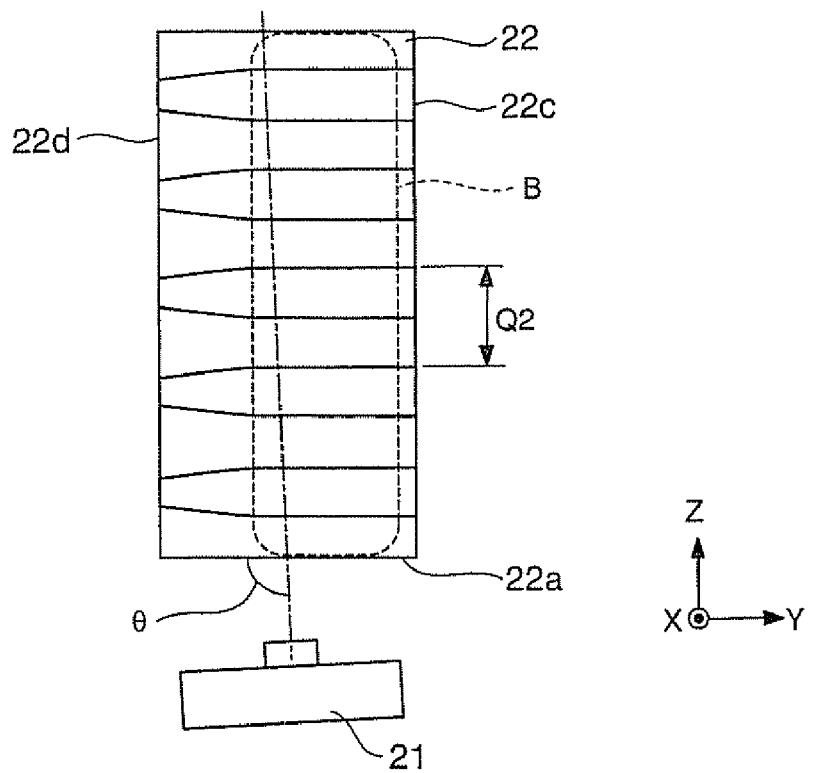
FIG. 5B is a plan view showing the interior structure of the wavelength converting element shown in FIG. 1.

As illustrated in FIG. 5B, a pitch Q2 of polarization inversion cycle in the Z direction varies in the Y direction during formation of the polarization inversion cycle at the time of manufacture. Thus, the conversion efficiency of the wavelength converting element 22 lowers depending on the position of the entrance end surface 22a through which light enters. In this embodiment, an area B surrounded by a broken line in FIG. 5B is a preferable area where the reflection efficiency is not low. More specifically, the area B is an area which efficiently converts the wavelength of light emitted from the light source 21. Thus, light needs to enter this area B.

An example of the method for fixing the wavelength converting element 22 and the external resonator 23 to the light source 21 of the light source device 10 having this structure in this embodiment is now described.

According to this embodiment, the exit end surface 21b of the light source 21 is inclined to the Y direction of the surface 13a of the sub base 13 as illustrated in FIG. 4.

The external resonator 23 is bonded to the surface 13b of the sub base 13. Also, the wavelength converting element 22 is bonded to the surface 13b of the sub base 13 via the temperature control unit 30.

Next, the sub base 13 is placed within the guide groove 12a of the tower 12. Then, the light entrance position of the entrance end surface 22a of the wavelength converting element 22 through which light emitted from the light source 21 enters and the light entrance position of the entrance end surface 23a of the external resonator 23 are controlled by shifting the tower 12 in the X and Y directions. Also, position adjustment of the entrance end surface 22a of the wavelength converting element 22 to the arrangement direction of the light emission elements 21a and position adjustment of the entrance end surface 23a of the external resonator 23 to the arrangement direction of the light emission elements 21a are simultaneously achieved by rotating the tower 12 around the Z axis to control the angle φ.

In this step, the intensity of light emitted from the light source 21 and released from the external resonator 23 via the wavelength converting element 22 is measured, and the position of the tower 12 is controlled such that the output intensity becomes high. By this method, light emitted from the plural light emission elements 21a of the light source 21 enters the area A of the external resonator 23 and the area B of the wavelength converting element 22.

Then, the base 11 and the tower 12 are fixed by using adhesive 31 as illustrated in FIG. 4 after position control of the tower 12.

Next, the sub base 13 is shifted in the Z direction along the guide groove 12a of the tower 12, and controlled such that the entrance end surface 23a of the external resonator 23 can be disposed at the focal point of the thermal lens 24. Then, the sub base 13 is rotated around the X axis to control the angle θ. More specifically, the sub base 13 is controlled such that light emitted from the light emission elements 21a of the light source 21 can enter the entrance end surface 22a of the wavelength converting element 22 in the vertical direction. The sub base 13 also shifts in the Y direction by the control of the angle θ. Thus, the sub base 13 is controlled such that light emitted from the plural light emission elements 21a of the light source 21 does not deviate from the area A of the wavelength converting element 22 and the area B of the external resonator 23 by the control of the angle θ. In this step, the intensity of light emitted from the light source 21 and released from the external resonator 23 via the wavelength converting element 22 is also measured, and the position of the sub base 13 is controlled such that the output intensity of light becomes high.

Figure 7:
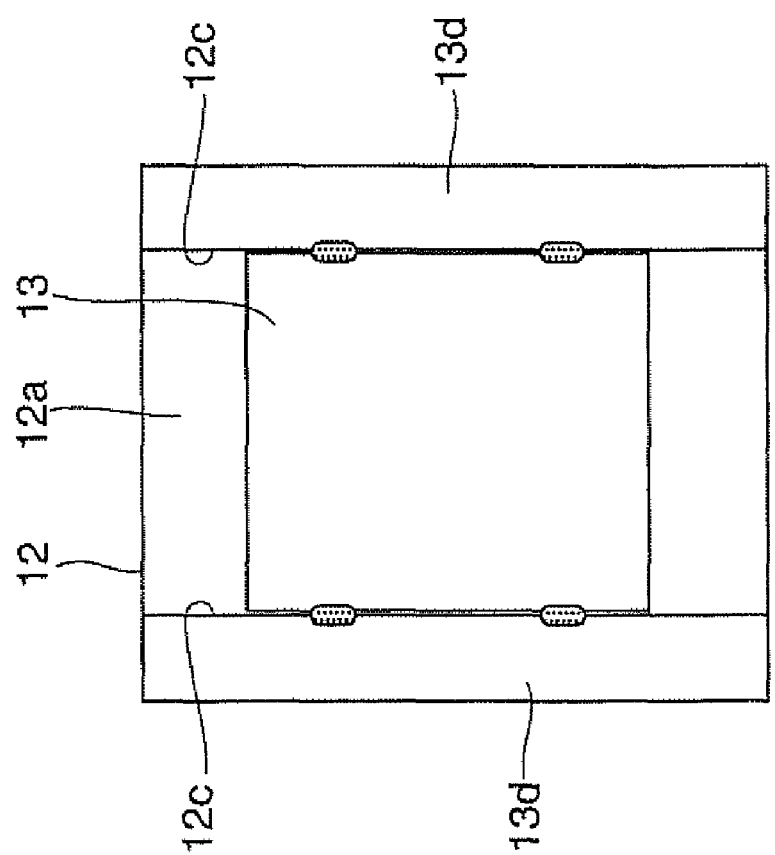
FIG. 7 is a cross-sectional side view showing a main part of the light source device shown in FIG. 1.

Then, a side 13d of the sub base 13 and a side 12c of the guide groove 12a of the tower 12 are bonded at four positions by using adhesive 32 as illustrated in FIG. 7 after the position control of the sub base 13.

Figure 8:
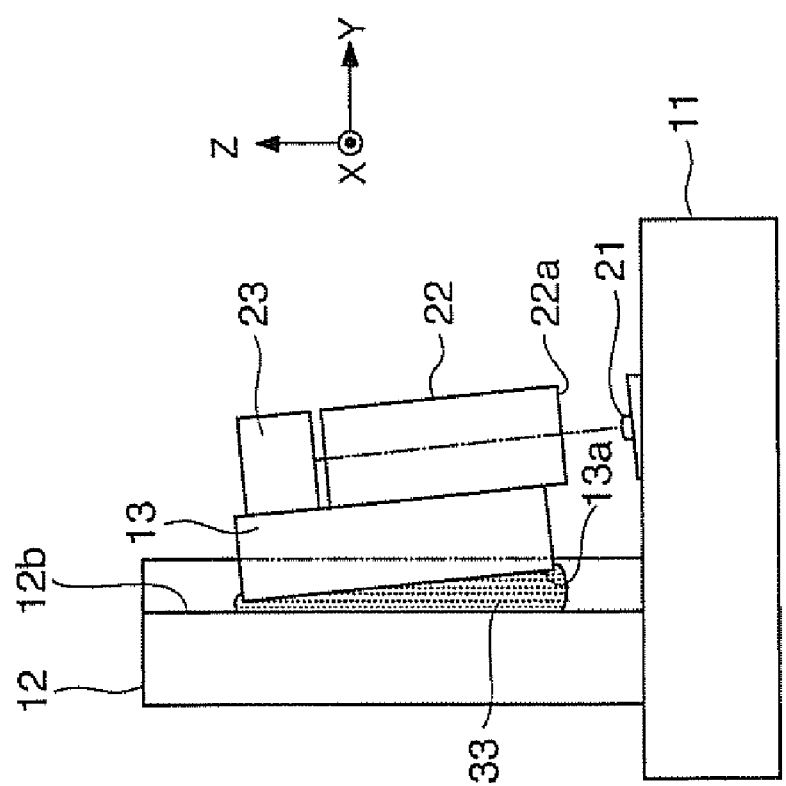
FIG. 8 is a side view of a light source device as an example having adhesive applied to a different position for comparison with that of the light source device shown in FIG. 1.

When the bottom 12b of the tower 12 and the surface 13a of the sub base 13 are fixed by adhesive 33 as illustrated in FIG. 8, the position of the sub base 13 with respect to the base 11 shifts due to the effect of hardening contraction or hygroscopic swelling of the adhesive 33. That is, the position of the entrance end surface 22a of the wavelength converting element 22 through which light emitted from the light source 21 enters shifts. In this embodiment, however, the sub base 13 is fixed by the side 12c of the guide groove 12a as illustrated in FIG. 7, and therefore the effects of hardening contraction and hygroscopic swelling of the adhesive 32 can be reduced. Accordingly, accurate position control of the light source 21, the wavelength converting element 22, and the external resonator 23 can be achieved.

According to the light source device 10 in this embodiment, the sub base 13 is fixed to the tower 12 by the adhesive 32. Thus, the shifts of the wavelength converting element 22 and the external resonator 23 in the Z direction with respect to the light source 21 and the rotations of the wavelength converting element 22 and the external resonator 23 around the X axis as steps requiring the highest performance of positioning can be arbitrarily controlled. Since these controls are easily performed in one step, the position control of the light source 21, the wavelength converting element 22, and the external resonator 23 can be efficiently achieved.

Moreover, light emitted from the light source 21 is introduced to the optimum position of the area B of the wavelength converting element 22 and the area A of the external resonator 23 by the function of the sub base 13. Furthermore, the reflection efficiency of the external resonator 23 is increased by disposing the external resonator 23 such that the entrance end surface 23a of the external resonator 23 coincides with the focal point of the thermal lens 24. In this case, light emitted from the light source is introduced to the optimum positions of the wavelength converting element 22 and the external resonator 23. Thus, the utilization efficiency of light at the wavelength converting elements 22 and the external resonator 23 can improve.

Since the guide groove 12a is formed on the tower 12, the position of the sub base 13 in the Z direction can be easily controlled.

The tower 12 fixed to the base 11 by the adhesive 31 can be arbitrarily controlled within the upper surface 11a of the base 11.

Figure 9:
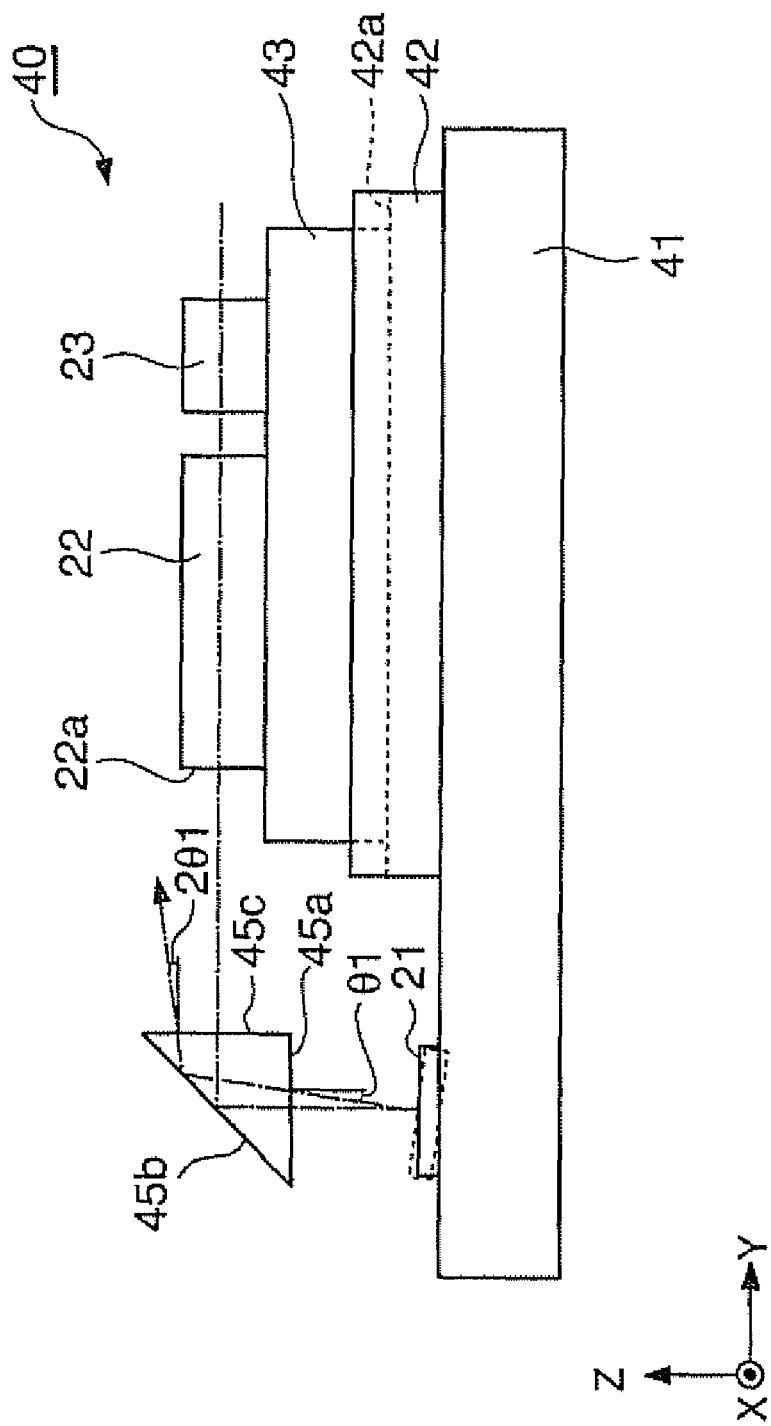
FIG. 9 is a plan view of a light source device as an example for comparison with the light source device shown in FIG. 1.

Since the tower 12 stands on the base 11, the light source 21, the wavelength converting element 22, and the external resonator 23 are linearly disposed. A light source device 40 which has a tower 42 on a base 41 as illustrated in FIG. 9 is now discussed as an example of a structure having the tower 12 which does not stand on the base 11.

In the light source device 40, a sub base 43 shifts in the Y direction along a guide groove 42a of the tower 42. The wavelength converting element 22 and the external resonator 23 are placed on the sub base 43 in the Y direction. A prism 45 is provided to bend light emitted from the light source 21 and traveling in the Z direction toward the Y direction. When the light source 21 is inclined as illustrated in FIG. 4, the light emitted from the light source 21 enters an entrance end surface 45a of the prism 45 at an angle of $\theta 1$. The light reflected by a reflection surface 45b of the prism 45 is released from an exit end surface 45c at an angle $2\theta 1$.

In this embodiment, the sub base 43 is rotated through the angle $\theta 1$ when the light emitted from the light source 21 enters the entrance end surface 45a of the prism 45 at the angle $\theta 1$. In the structure having the tower 42 not standing on the base 41, however, an angle twice larger than the angle formed by the entrance end surface 45a of the prism 45 and the light emitted from the light source 21 is required to be controlled in the sub base 43. Moreover, in the structure having the tower 42 not standing on the base 41, control in the Z direction is difficult.

According to the structure in this embodiment, however, the control amount for the sub base 13 is small. Thus, the work efficiency of the position control over the light source 21, the wavelength converting element 22, and the external resonator 23 increases.

According to the light source device 10 in this embodiment, therefore, the light output from the wavelength converting element 22 and the external resonator 23 as well as efficiency can be raised, and cost can be reduced by decreasing the number of steps for assembly.

Moreover, the light source 21 can be disposed close to the wavelength converting element 22 by projecting the entrance end surface 22a of the wavelength converting element 22 from the end surface 13c of the sub base 13 toward the light source 21. Thus, the entire size of the device can be reduced.

According to the light source device 10, the sub base 13 is fixed to the tower 12 after position control in all the directions of XY direction, Z direction, $\theta$ direction, and $\phi$ direction. In this case, the light utilization efficiency of the wavelength converting element 22 and the external resonator 23 can be increased by accurate control particularly in the Z direction and $\theta$ direction.

While the wavelength converting element 22 and the external resonator 23 are fixed by the one sub base 13 in this embodiment, the wavelength converting element 22 and the external resonator 23 may be separately fixed by the corresponding sub bases 13. In this structure, the positions of the wavelength converting element 22 and the external resonator 23 are separately controlled. Thus, the wavelength converting element 22 and the external resonator 23 can be disposed at more preferable positions.

While the tower 12 and the sub base 13 are fixed by the adhesive 33, they may be fixed by welding.

The exit end surface 23b of the external resonator 23 may project from the sub base 13. In this structure, an optical element disposed in the rear part of the light source device 10 is positioned close to the external resonator 23. Thus, the entire size of the device can be reduced, The mechanism for shifting the sub base 13 in the Z direction is not limited to the tower 12 having the concave 12a.

Modified Example 1 of First Embodiment

According to the light source device 10 in the first embodiment shown in FIG. 1, the sub base 13 is fixed to the tower 12 after position control in the XY direction, Z direction, $\theta$ direction, and $\phi$ direction. According to a light source device 50, however, the tower 12 is further rotatable around the Y axis.

Figure 10A:
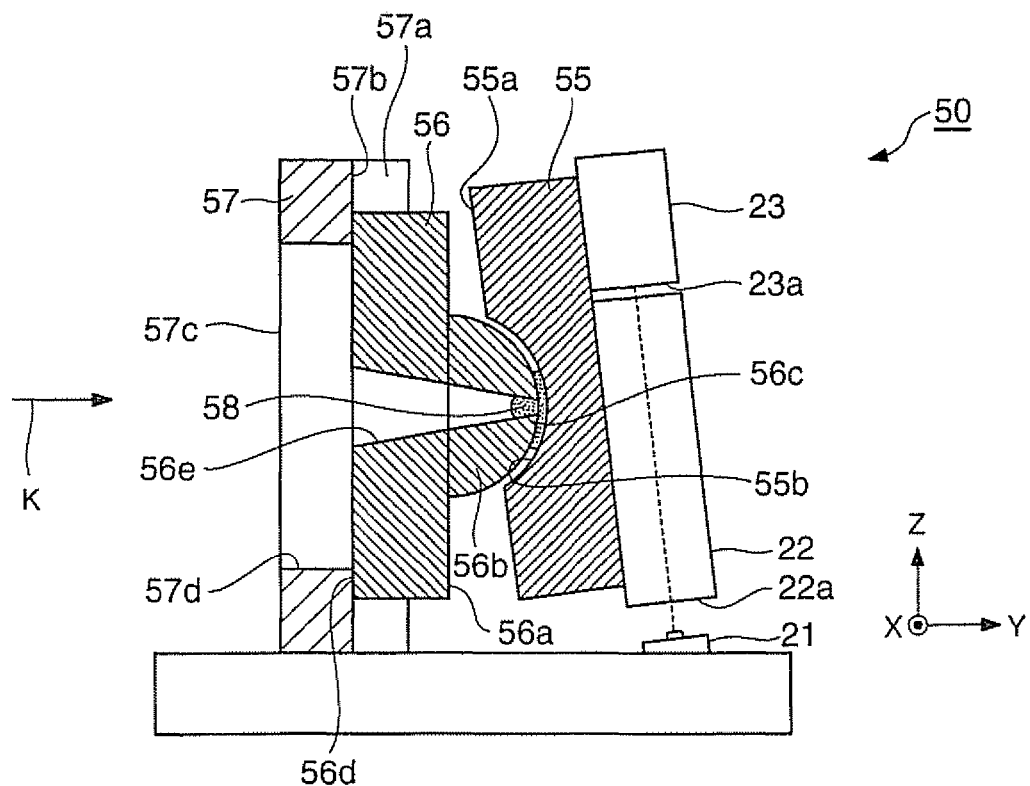
FIGS. 10A and 10B are cross-sectional views illustrating a main part of a light source device as a modified example of the light source device shown in FIG. 1.

In the structure capable of rotating the wavelength converting element 22 and the external resonator 23 around the X axis, Y axis and Z axis, a sub base 55, a rotation member 56, and a tower 57 illustrated in FIG. 10A are provided. The sub base 55 has a hemispherical concave 55b on a surface 55a on the tower 57 side.

The rotation member 56 is a flat-plate-shaped, and has a hemispherical convex 56b on a surface 56a opposed to the sub base 55. The convex 56b of the rotation member 56 engages with the concave 55b of the sub base 55, and is rotatable around the X axis, Y axis, and Z axis within the concave 55b. A through hole 56e extends from a top 56c of the convex 56b of the rotation member 56 toward a surface 56d opposed to the tower 57.

Figure 10B:
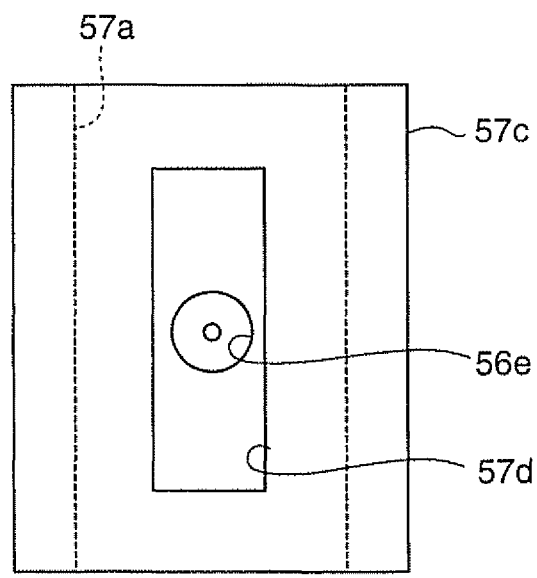

A guide groove 57a is formed on the tower 57 in the manner similar to the first embodiment to hold the rotation member 56 such that the rotation member 56 can shift in the Z direction. A through hole 57d further extends from a surface 57b where the guide groove 57a of the tower 57 is formed toward an opposite surface 57c. The size of the through hole 57d is larger than that of the through hole 56e of the rotation member 56 as illustrated in FIG. 10B as a figure viewed in the direction of an arrow K in FIG. 10A.

An example method for fixing the wavelength converting element 22 and the external resonator 23 to the light source 21 is now described.

Similarly to the first embodiment, the light entrance position of the entrance end surface 22a of the wavelength converting element 22 through which light emitted from the light source 21 enters, and the entrance end surface 23a of the external resonator 23 are controlled. Then, the rotation member 56 is shifted in the Z direction along the guide groove 57a of the tower 57 to control the distance between the light source 21 and the entrance end surface 22a of the wavelength converting element 22. After the rotation member 56 is fixed to the tower 57, the rotation member 56 is rotated around the X axis, Y axis, and Z axis with respect to the sub base 55 to control the light entrance positions and the incident angles of the light emitted from the light source 21 with respect to the entrance end surface 22a of the wavelength converting element 22 and the entrance end surface 23a of the external resonator 23.

After the positions of the wavelength converting element 22 and the external resonator 23 are adjusted to the light source 21, the through hole 56e of the rotation member 56 and the concave 55b of the sub base 55 are fixed by adhesive 58 from the through hole 57d side of the tower 57.

According to this structure, the positions of the wavelength converting element 22 and the external resonator 23 with respect to the light source 21 are controlled toward the six axis directions. Thus, light can enter the optimum positions of the wavelength converting element 22 and the external resonator 23 with higher accuracy.

Modified Example 2 of First Embodiment

A light source device 60 in this modified example is different from the light source device 10 in the first embodiment in that an external mirror 61 is provided in place of the external resonator 23, and that a prism 65 is provided between the light source 21 and the wavelength converting element 22. Other parts are similar to those in the first embodiment.

Figure 11:
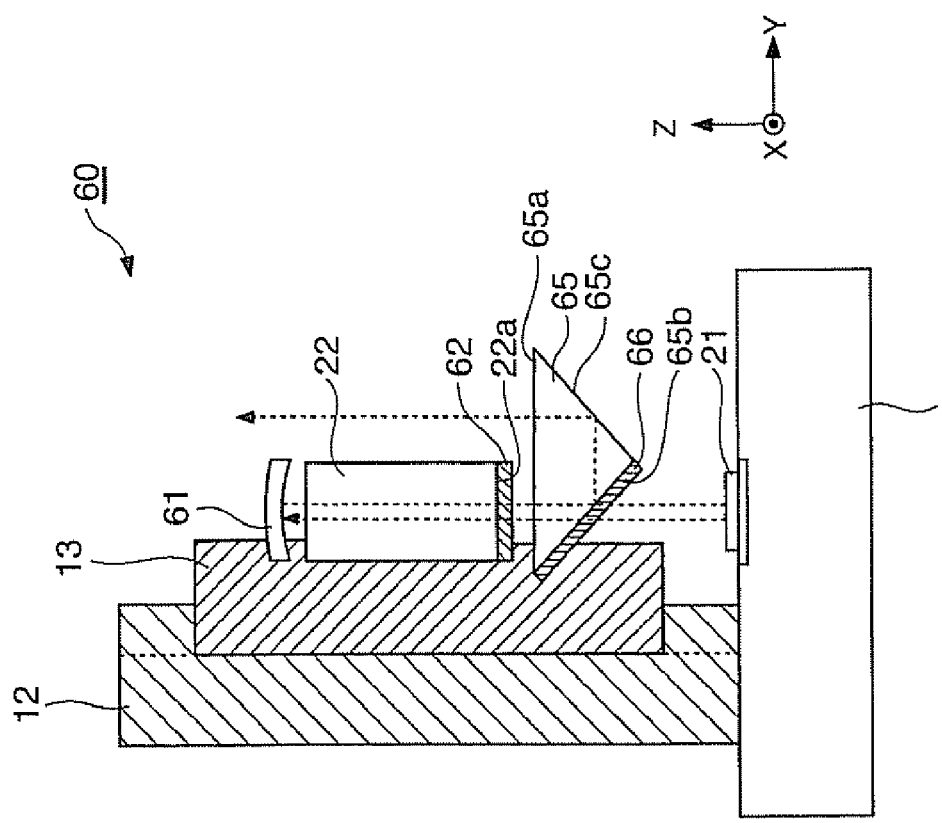
FIG. 11 is a cross-sectional view illustrating a main part of another light source device as another modified example of the light source device shown in FIG. 1.

As illustrated in FIG. 11, the external mirror 61 is a wide-band mirror, and reflects light emitted from the wavelength converting element 22 such that the light returns thereto.

The entrance end surface 22a of the wavelength converting element 22 has a wavelength selection film (dielectric multi-layer film) 62 functioning as a resonator mirror. The wavelength selection film 62 selectively transmits light having half wavelength by the conversion of the wavelength converting element 22, and reflects other light. Thus, light other than the light having half wavelength by the conversion of the wavelength converting element 22 is returned to the external mirror 61. In this embodiment, the wavelength selection film 62 has characteristics of selectively reflecting only light having wavelength other than predetermined wavelength by the conversion of the wavelength converting element 22 (infrared light: fundamental wavelength light) with high efficiency of about 99%.

The prism 65 is a component having triangle pole shape and characteristics of light transmissivity. The prism 65 has a surface 65a opposed to the wavelength converting element 22, a separation surface 65b for separating entering light, and a reflection surface 65c for reflecting entering light.

The separation surface 65b of the prism 65 has a separation film (dielectric multilayer film) 66. The separation surface 65b is disposed on the optical path between the light source 21 and the wavelength converting element 22. The separation film 66 has characteristics of transmitting light emitted from the light source 21 toward the wavelength converting element 22 and reflecting light having predetermined wavelength by the conversion of the wavelength converting element 22.

The light having the predetermined wavelength and reflected by the separation film 66 is reflected by the reflection surface 65c of the prism 65, and enters a rod integrator (not shown) disposed in the rear part, for example.

The prism 65, the wavelength converting element 22, and the external mirror 61 are fixed to the sub base 13. Similarly to the first embodiment, the positions of the tower 12 and the sub base 13 are controlled such that light emitted from the light source 21 enters the optimum positions of the entrance end surface 22a of the wavelength converting element 22 and the wavelength selection film 62.

According to this structure, the tower 12 stands on the base 11 similarly to the first embodiment. In this case, the light source 21, the prism 65, the wavelength converting element 22, and the external mirror 61 are linearly disposed. Thus, in adjustment of the position of the wavelength converting element 22 with respect to the light source 21, the control around the Z direction and the X axis as particularly important control can be performed with high efficiency.

Second Embodiment: Lighting Device

A second embodiment is now described. In this embodiment, an example of a lighting device employing the light source device described in the above embodiment is discussed.

Figure 12:
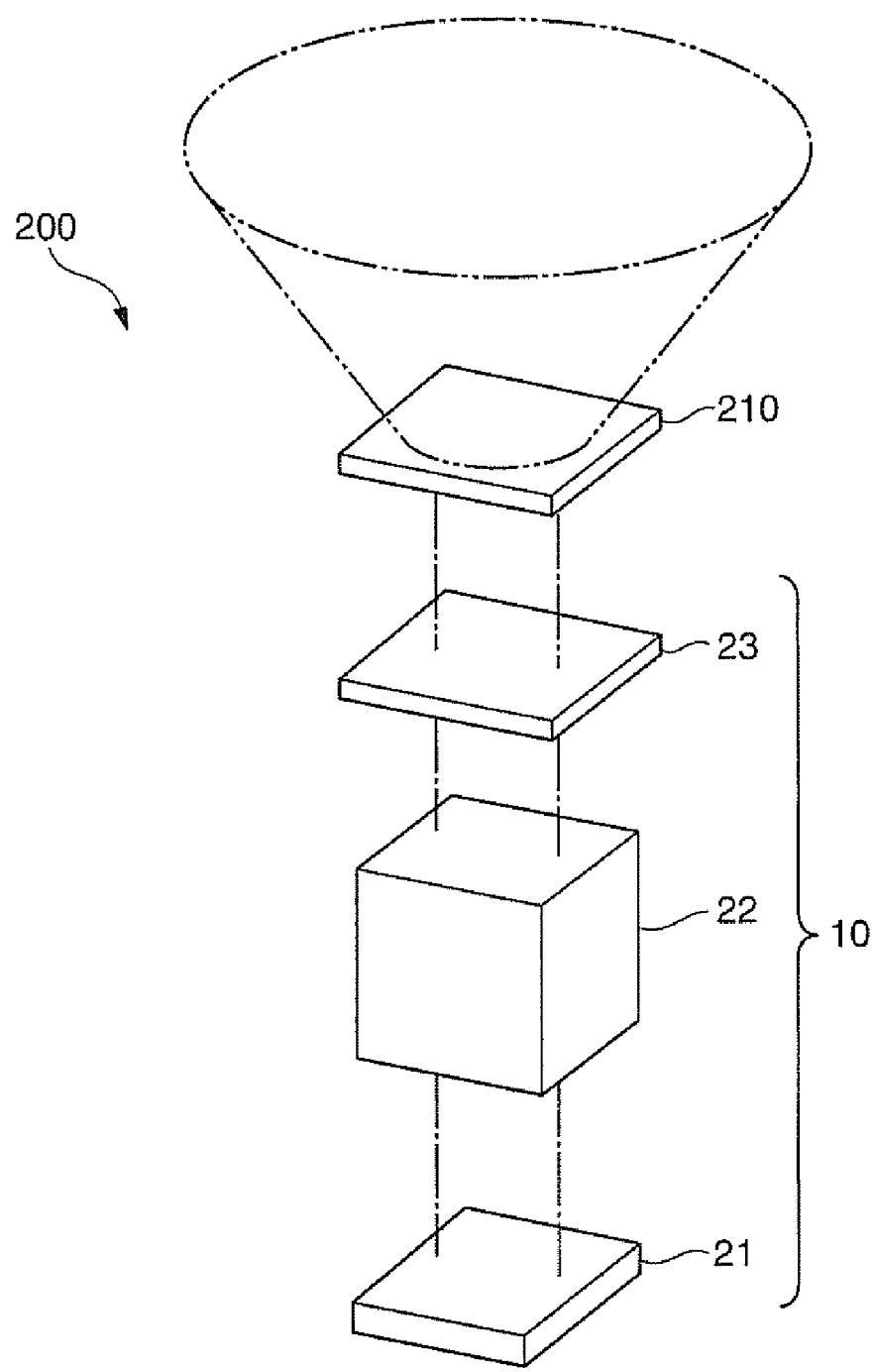
FIG. 12 is a perspective view of a lighting device according to a second embodiment of the invention.

FIG. 12 schematically illustrates a lighting device 200 in this embodiment. As illustrated in FIG. 12, the lighting device 200 includes the light source device 10 shown in the first embodiment, and a diffusion plate 210 for diffusing light emitted from the light source device 10.

According to the lighting device 200 having this structure, the light source device 10 capable of reducing generation of scintillation is provided. Thus, scintillation from the lighting device 200 is reduced.

Third Embodiment: Projector

A third embodiment is now described. In this embodiment, an example of a projector including the light source device 10 shown in the above embodiment is discussed.

Figure 13:
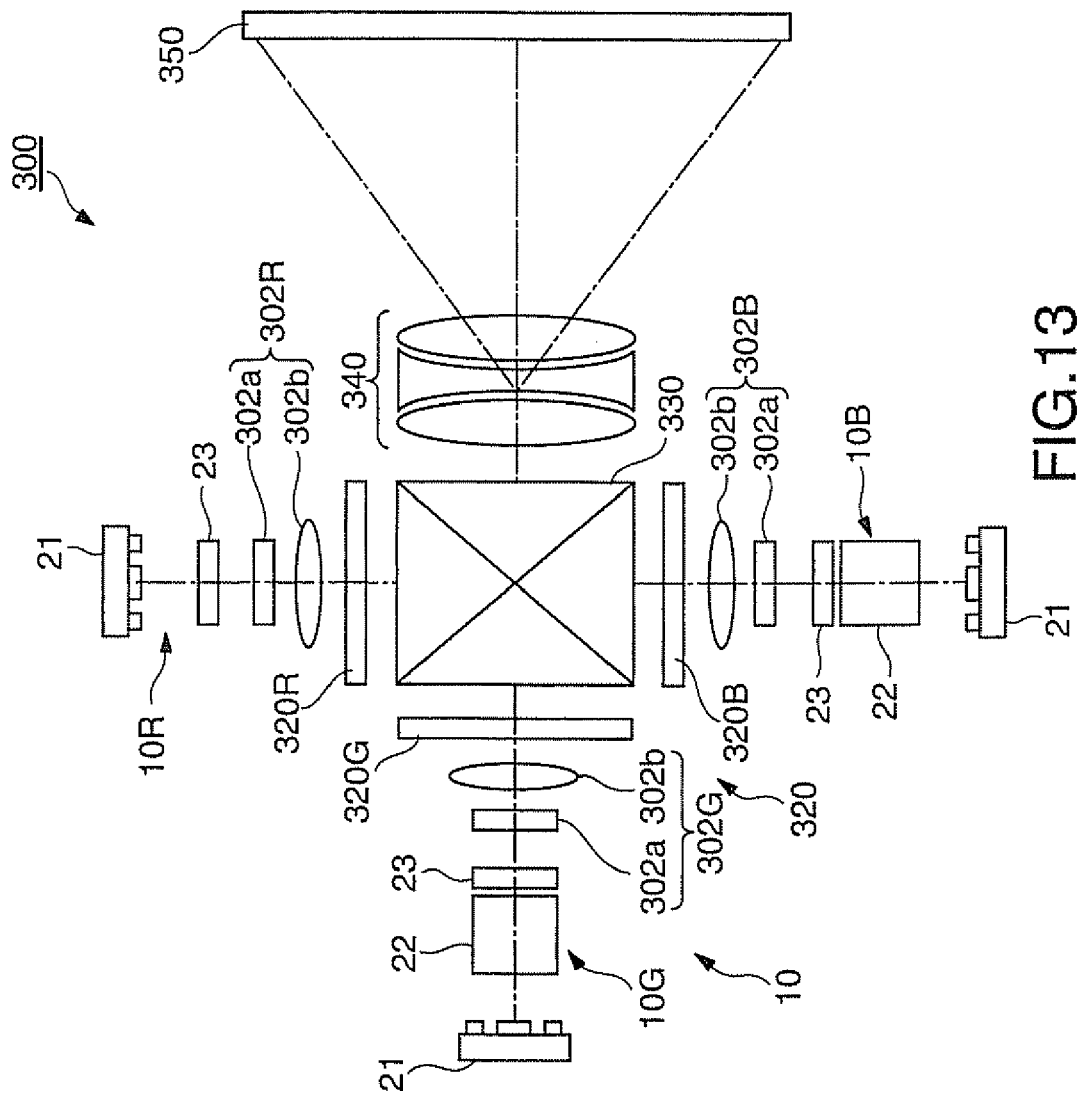
FIG. 13 is a perspective view of a projector according to a third embodiment of the invention.

As illustrated in FIG. 13, a projector 300 in this embodiment uses a reflection-type screen 350, and projects light containing image information onto the screen 350 from the front side of the screen 350.

As illustrated in FIG. 13, the projector 300 includes the light source device 10, a light modulating device (light modulating unit) 320, a dichroic prism (color combining unit) 330, and a projecting device 340.

The light source device 10 has a red light source device (light source) 10R for emitting red light, a green light source device (light source) 10G for emitting green light of the first embodiment, and a blue light source device (light source) 10B for emitting blue light of the first embodiment.

The liquid crystal light valve 320 has a two-dimensional red light modulation device 320R for modulating light emitted from the red light source device 10R according to image information, a two-dimensional green light modulation device 320G for modulating light emitted from the green light source device 10G according to image information, and a two-dimensional blue light modulation device 320B for modulating light emitted from the blue light source device 10B according to image information. The dichroic prism 330 combines respective color lights modulated by the light modulation devices 320R, 320G and 320B.

Equalizing systems 302R, 302G and 302B are provided on the optical path in the area downstream from the respective light source devices 10R, 10G and 10B to equalize illuminance distribution of lights emitted from the light source devices 10R, 10G and 10B. Lights having equalized illuminance distribution by the equalization of the equalizing systems 302R, 302G and 302B are applied to the liquid crystal light valves 320R, 320G and 320B. Each of the equalizing systems 302R, 302G and 302B is constituted by a hologram 302a and a field lens 302b, for example.

The projecting device 340 projects light combined by the dichroic prism 330 onto the screen 350.

According to the projector 300 having this structure, the light source devices 10R, 10G and 10B capable of utilizing light with high efficiency are provided. Thus, a bright and clear image can be projected on the screen 350.

While the red light source device 10R is constituted by a light source device which emits red light (visible light) from the light source 21, the red light source device 10R may be a light source device which converts wavelength of infrared light emitted from the light source 21 in the similar manner to the light source device 10 of the first embodiment.

The light source device 10 in the first embodiment is applicable to a scanning-type image display apparatus as well as the projector 300.

Fourth Embodiment: Monitoring Device

Figure 14:
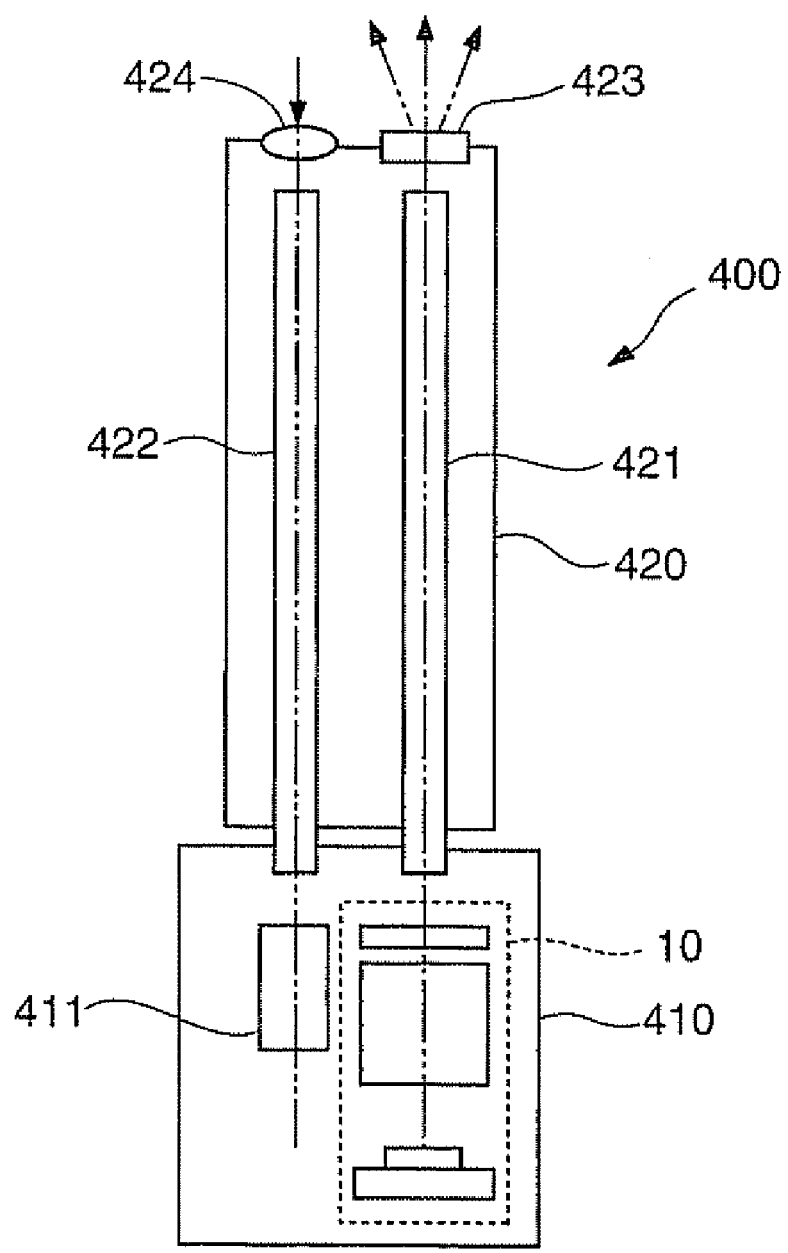
FIG. 14 is a perspective view of a monitoring device according to a fourth embodiment of the invention.

An example of a monitoring device 400 including the light source device 10 in the first embodiment is now described. FIG. 14 schematically illustrates the monitoring device. The monitoring device 400 includes a main body 410 and a light transmitting unit 420.

The light transmitting unit 420 has a light guide 421 for transmitting light, and a light guide 422 for receiving light. Each of the light guides 421 and 422 has a number of optical fibers to transmit laser beam to a distant place. The light source device 10 is disposed on the entrance side of the light guide 421 for transmitting light, and the diffusing plate 423 is disposed on the exit side. Laser beam emitted from the light source device 10 is transmitted through the light guide 421 to the diffusing plate 423 disposed at the end of the light transmitting unit 420, and diffused by the diffusing plate 423 to be applied to a subject.

An image forming lens 424 is provided at the end of the light transmitting unit 420 to receive reflection light from the subject on the image forming lens 424. The received reflection light is transmitted through the receiving side light guide 422 to a camera 411 as an image pickup unit provided within the device main body 410. Thus, an image corresponding to the reflection light obtained by applying laser beam emitted from the light source device 10 to the subject can be shot by the camera 411.

According to the monitoring device 400 having this structure, light emitted from the light source device 10 having high light utilization efficiency is applied to the subject. Thus, the brightness of the image shot by the camera 411 can increase.

The technical scope of the invention is not limited to the embodiments described and depicted herein. It is thus intended that various modifications and changes may be made without departing from the scope and spirit of the invention.

For example, the color combining unit is not limited to the cross dichroic prism, but may be a unit having dichroic mirrors disposed in a cross shape for combining color lights, or a unit having dichroic mirrors disposed in parallel for combining color lights.

The entire disclosure of Japanese Patent Application No.2007-220831, filed Aug. 28, 2007 is expressly incorporated by reference herein.

What is claimed is:

1. A light source device, comprising:
   a light source which emits light;
   an optical member through which light emitted from the light source enters, the optical member having an external resonator which resonates the light emitted from the light source;
   a base on which the light source is mounted;
   a first holding member which fixes the optical member; and
   a second holding member which holds the first holding member and stands on the base in the emission direction of the light emitted from the light source.

2. The light source device according to claim 1, wherein the first holding member is fixed to the second holding member by bonding or welding.

3. The light source device according to claim 2, wherein:
   the second holding member has a concave extending in the emission direction of the light emitted from the light source; and
   at least a part of the first holding member is contained in the concave.

4. The light source device according to claim 1, wherein the second holding member is fixed to the base by bonding or welding.

5. The light source device according to claim 1, wherein at least either a light entrance end surface or a light exit end surface of the optical member projects toward the outside from the end surface of the first holding member in the center axis direction of the light emitted from the light source.

6. A lighting device comprising the light source device according to claim 1.

7. A projector, comprising:
   the light source device according to claim 1;
   a light modulating unit which modulates light emitted from the light source unit; and
   a projecting device which projects light modulated by the light modulating unit.

8. A monitoring device, comprising:
   the light source device according to claim 1; and
   an image pickup unit which picks up an image of a subject by using light emitted from the light source device.

\* \* \* \* \*